(12) United States Patent
Walker et al.

(10) Patent No.: US 12,074,414 B2
(45) Date of Patent: Aug. 27, 2024

(54) METHOD AND APPARATUS FOR INSERTING AN ELONGATE OBJECT INTO A TRENCH IN A SEA FLOOR

(71) Applicant: Soil Machine Dynamics Limited, Wallsend (GB)

(72) Inventors: John Graeme Walker, Wallsend (GB); Roger Paul White, Wallsend (GB)

(73) Assignee: Soil Machine Dynamics Limited, Wallsend (GB)

( * ) Notice: Subject to any disclaimer, the term of this patent is extended or adjusted under 35 U.S.C. 154(b) by 105 days.

(21) Appl. No.: 17/766,057

(22) PCT Filed: Sep. 16, 2020

(86) PCT No.: PCT/EP2020/075803
§ 371 (c)(1),
(2) Date: Apr. 1, 2022

(87) PCT Pub. No.: WO2021/063675
PCT Pub. Date: Apr. 8, 2021

(65) Prior Publication Data
US 2022/0352699 A1    Nov. 3, 2022

(30) Foreign Application Priority Data

Oct. 2, 2019   (EP) .................................... 19201094

(51) Int. Cl.
*H02G 1/10*   (2006.01)
*B63B 35/04*   (2006.01)
(Continued)

(52) U.S. Cl.
CPC .............. *H02G 1/10* (2013.01); *B63B 35/04* (2013.01); *F16L 1/16* (2013.01); *F16L 1/18* (2013.01);
(Continued)

(58) Field of Classification Search
CPC ..... H02G 1/10; H02G 9/02; F16L 1/16; F16L 1/165; F16L 1/18; F16L 1/235
(Continued)

(56) References Cited

U.S. PATENT DOCUMENTS 2,048,710 A   7/1936   Ranney
2,136,911 A   11/1938   Briscoe
(Continued)

FOREIGN PATENT DOCUMENTS

CN   105202263 A   * 12/2015
DE   19542689 C1   4/1997
(Continued)

OTHER PUBLICATIONS

European Patent Office, Partial Search Report, Application No. 22181186.2, Nov. 21, 2022, 13 pages.
(Continued)

*Primary Examiner* — Frederick L Lagman
(74) *Attorney, Agent, or Firm* — Reinhart Boerner Van Deuren s.c.

(57) ABSTRACT

A vehicle for deploying a cable into a trench in the sea bed is disclosed. The vehicle comprises a body adapted to move relative to the trench in the sea bed, and a bellmouth for engaging the cable and mounted to the body, wherein the bellmouth is adapted to define an open channel in a direction facing the trench for engaging the cable.

18 Claims, 16 Drawing Sheets

(51) Int. Cl.
*F16L 1/16* (2006.01)
*F16L 1/18* (2006.01)
*F16L 1/235* (2006.01)
*H02G 9/02* (2006.01)

(52) U.S. Cl.
CPC ............... *F16L 1/235* (2013.01); *H02G 9/02* (2013.01); *B63B 2207/02* (2013.01)

(58) Field of Classification Search
USPC ................................. 405/159, 163, 164, 166
See application file for complete search history.

(56) References Cited

U.S. PATENT DOCUMENTS

| | | | |
|---|---|---|---|
| RE20,990 E | 1/1939 | Wright | |
| 2,849,809 A | 9/1958 | Chattin | |
| 3,238,734 A | 3/1966 | Rhodes | |
| 3,333,432 A | 8/1967 | Hale et al. | |
| 3,434,297 A | 3/1969 | Gretter et al. | |
| 3,462,963 A | 8/1969 | Moore | |
| 3,504,504 A | 4/1970 | Elliott | |
| 3,526,047 A | 9/1970 | Roessler et al. | |
| 3,590,589 A | 7/1971 | Smulders | |
| 3,627,372 A | 12/1971 | Carpenter et al. | |
| 3,670,514 A | 6/1972 | Breston et al. | |
| 3,722,224 A | 3/1973 | Roy | |
| 3,751,927 A | 8/1973 | Perot, Jr. | |
| 3,877,237 A | 4/1975 | Norman | |
| 3,897,639 A | 8/1975 | Hansen | |
| 3,990,377 A | 11/1976 | Marquinez | |
| 4,022,028 A | 5/1977 | Martin | |
| 4,037,422 A * | 7/1977 | DEBoer | E02F 5/107 405/160 |
| 4,039,087 A | 8/1977 | Sandvick, Sr. | |
| 4,091,629 A | 5/1978 | Gunn et al. | |
| 4,124,991 A | 11/1978 | Adler | |
| 4,129,992 A * | 12/1978 | Carlsson | H02G 1/10 405/164 |
| 4,149,326 A | 4/1979 | Rosa et al. | |
| 4,218,158 A | 8/1980 | Tesson | |
| 4,268,189 A | 5/1981 | Good | |
| 4,268,190 A | 5/1981 | Tesson | |
| 4,274,760 A | 6/1981 | Norman | |
| 4,295,757 A * | 10/1981 | Gaspar | E02F 5/107 405/164 |
| 4,301,606 A | 11/1981 | Hofmeester | |
| 4,362,436 A * | 12/1982 | Harmstorf | E02F 5/109 405/164 |
| 4,410,297 A | 10/1983 | Lynch | |
| 4,465,400 A | 8/1984 | Adams | |
| 4,470,720 A | 9/1984 | Lennard | |
| 4,585,372 A | 4/1986 | Grinstead et al. | |
| 4,586,850 A | 5/1986 | Norman et al. | |
| 4,714,378 A | 12/1987 | Lincoln | |
| 4,714,379 A | 12/1987 | Gilchrist, Jr. | |
| 4,721,409 A | 1/1988 | Harmstorf | |
| 4,749,308 A | 6/1988 | Izawa | |
| 4,802,793 A | 2/1989 | Grinsted et al. | |
| 4,812,079 A | 3/1989 | Johnson et al. | |
| 4,877,355 A | 10/1989 | Van Pelt | |
| 4,896,998 A * | 1/1990 | Reece | F16L 1/12 405/160 |
| 4,992,000 A * | 2/1991 | Doleshal | E02F 5/108 405/164 |
| 5,349,765 A | 9/1994 | Kitanaka et al. | |
| 5,626,438 A | 5/1997 | Etheridge | |
| 5,659,983 A | 8/1997 | Coutarel et al. | |
| 5,722,793 A * | 3/1998 | Peterson | B63B 35/06 405/164 |
| 5,795,101 A | 8/1998 | Bill | |
| 6,189,244 B1 | 2/2001 | Johnson et al. | |
| 6,273,642 B1 * | 8/2001 | Anderson | E02F 5/105 405/163 |
| 6,705,029 B2 * | 3/2004 | Anderson | E02F 5/14 405/160 |
| 6,719,494 B1 | 4/2004 | Machin | |
| 6,837,653 B1 | 1/2005 | Grinsted | |
| 8,939,678 B2 | 1/2015 | Lazzarin et al. | |
| 9,605,407 B2 | 3/2017 | Penner | |
| 10,323,383 B2 | 6/2019 | Wilson | |
| 10,711,432 B2 | 7/2020 | White et al. | |
| 10,947,695 B2 | 3/2021 | Lu et al. | |
| 11,466,425 B2 | 10/2022 | Alumbaugh | |
| 11,613,870 B2 | 3/2023 | Walker et al. | |
| 2002/0017041 A1 | 2/2002 | Gloppen et al. | |
| 2003/0201011 A1 | 10/2003 | Beals et al. | |
| 2007/0253780 A1 | 11/2007 | Pihl | |
| 2010/0095560 A1 | 4/2010 | Grinsted et al. | |
| 2011/0211913 A1 | 9/2011 | Lazzarin et al. | |
| 2012/0114420 A1 | 5/2012 | Lazzarin et al. | |
| 2013/0115006 A1 * | 5/2013 | Oldervoll | E02F 5/109 405/160 |
| 2014/0150303 A1 | 6/2014 | Wilson | |
| 2014/0154014 A1 | 6/2014 | Wilson | |
| 2014/0283421 A1 | 9/2014 | Manchester | |
| 2014/0345171 A1 | 11/2014 | Manchester | |
| 2015/0110563 A1 | 4/2015 | Manchester | |
| 2016/0215476 A1 | 7/2016 | Walker | |
| 2018/0216314 A1 | 8/2018 | Bonel et al. | |
| 2020/0165796 A1 | 5/2020 | Manchester | |
| 2020/0318314 A1 | 10/2020 | Lu et al. | |
| 2021/0010230 A1 | 1/2021 | Haddorp et al. | |
| 2021/0292995 A1 | 9/2021 | Walker et al. | |
| 2022/0412046 A1 | 12/2022 | White | |

FOREIGN PATENT DOCUMENTS

| | | |
|---|---|---|
| EP | 0296783 A1 | 12/1988 |
| EP | 0543467 A1 | 5/1993 |
| EP | 2787126 A1 | 10/2014 |
| EP | 2840187 A1 | 2/2015 |
| EP | 3121917 A1 | 1/2017 |
| EP | 3499662 A1 | 6/2019 |
| EP | 4047141 A1 | 8/2022 |
| GB | 2049094 A | 12/1980 |
| GB | 2172032 A | 9/1986 |
| GB | 2212536 A | 7/1989 |
| GB | 2355276 A | 4/2001 |
| GB | 2545925 A | 7/2017 |
| JP | 2015077008 A | 4/2015 |
| KR | 20120065024 A | 6/2012 |
| NL | 2024240 B1 | 7/2021 |
| RU | 2010139625 A | 4/2012 |
| WO | 9954556 A1 | 10/1999 |
| WO | 0149947 A1 | 7/2001 |
| WO | 0175236 A1 | 10/2001 |
| WO | 2009141409 A2 | 11/2009 |
| WO | WO-2012007790 A1 * | 1/2012 .............. E02F 5/105 |
| WO | 2013167910 A1 | 11/2013 |
| WO | 2014161984 A1 | 10/2014 |
| WO | 2015032730 A1 | 3/2015 |
| WO | 2017017599 A1 | 2/2017 |
| WO | 2021094193 A1 | 5/2021 |

OTHER PUBLICATIONS

European Patent Office, Extended Search Report, Application No. 19213813.9, May 18, 2020, 9 pages.
European Patent Office, Extended Search Report, Application No. 20164557.9, Nov. 19, 2020, 12 pages.
Danish Patent and Trademark Office, Search Report and Opinion, Application No. PA201870577, Jul. 12, 2019, 9 pages.
PCT International Search Report and Written Opinion, PCT/EP2017/054300, May 11, 2017, 12 pages.
PCT International Search Report and Written Opinion, PCT/EP2020/075803, Feb. 23, 2021, 14 pages.
European Patent Office, Extended Search Report, Application No. 22181186.2, Feb. 27, 2023, 12 pages.
European Patent Office, Extended Search Report, Application No. 21182054.3, Dec. 22, 2021, 7 pages.

(56) References Cited

OTHER PUBLICATIONS

The State Intellectual Property Office of People's Republic of China, First Office Action, Application No. 202080074740.3, Nov. 17, 2023, 35 pages (including machine translation).
European Patent Office, Third Party Observations, dated Jun. 18, 2024, 8 pages.
"Development of Submarine Cable Plough Burial of Fibre Optic Submarine Cables," Jönsson et al., Teleteknik 1986, vol. 1, English Edition.

\* cited by examiner

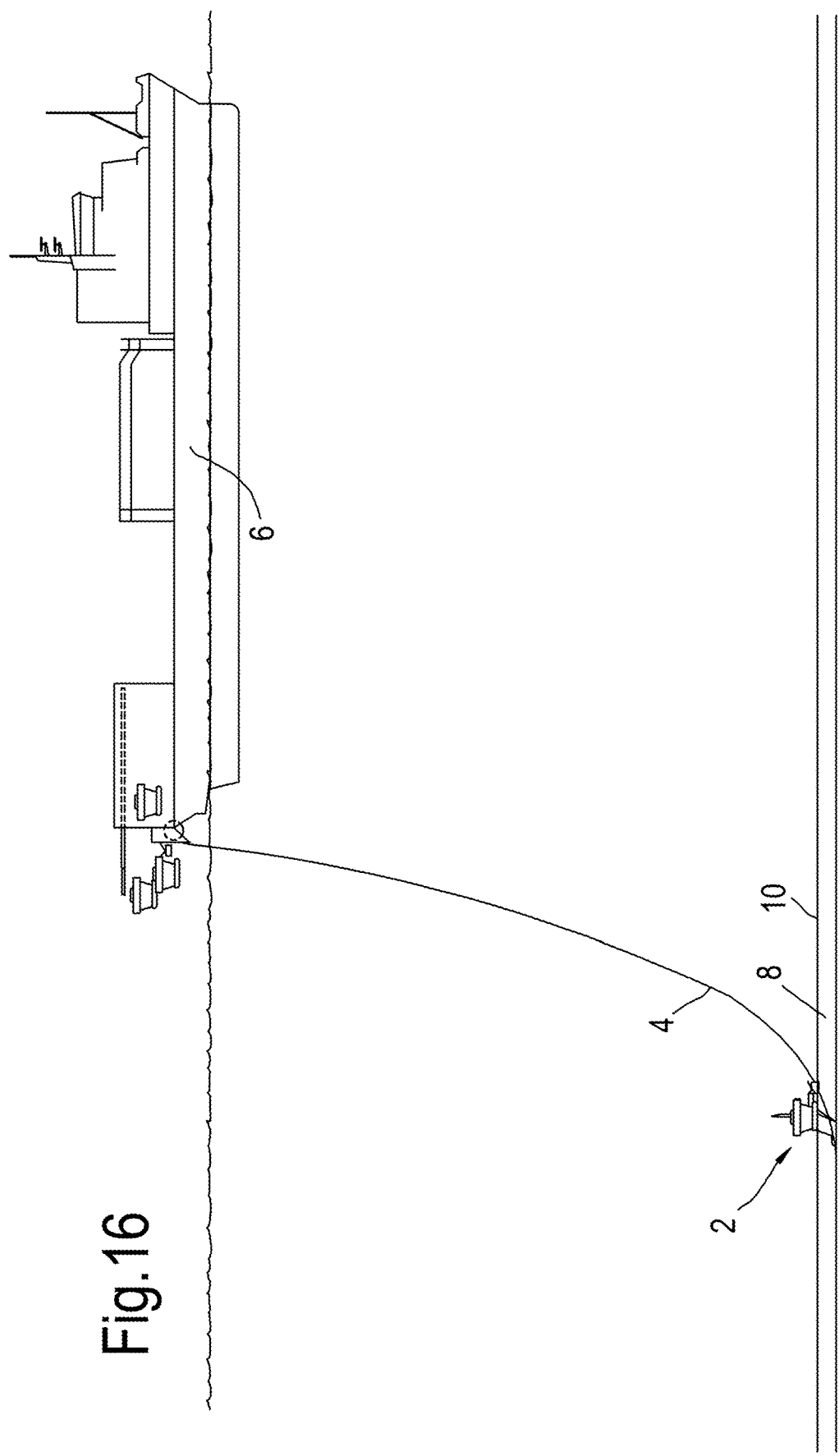

METHOD AND APPARATUS FOR INSERTING AN ELONGATE OBJECT INTO A TRENCH IN A SEA FLOOR

CROSS REFERENCE TO RELATED APPLICATIONS

This application represents the U.S. national stage entry of International Application No. PCT/EP2020/075803 filed Sep. 16, 2020, which claims priority to European Patent Application No. 19201094.0 filed Oct. 2, 2019, the disclosures of which are incorporated herein by reference in their entirety and for all purposes.

The present disclosure relates to a method and apparatus for inserting an elongate object into a trench in a floor of a body of water, and relates particularly, but not exclusively, to a method and apparatus for inserting a cable into a trench in a sea floor.

Apparatus for inserting a cable into a trench in a sea floor are known which comprise a vehicle remotely operated from a surface vessel via an umbilical cable, wherein the vehicle moves along a cable and inserts the cable into a pre-formed trench. However, apparatus of this type suffer from the drawback that the speed of deployment is limited, and there is a risk of damage to the cable because the apparatus encloses the cable.

Preferred embodiment of the present disclosure seek to overcome one or more of the above disadvantages of the prior art.

According to an aspect of the present disclosure, there is provided an apparatus for deploying an elongate object into a trench in a floor of a body of water, the apparatus comprising a body adapted to move relative to a trench in a floor of a body of water, and an engaging device for engaging an elongate object and mounted to the body, wherein the engaging device is adapted to define an open channel in a direction facing the trench for engaging the elongate object.

By providing an engaging device adapted to define an open channel in a direction facing the trench for engaging the elongate object, this provides the advantage of enabling the position of the elongate object to be more accurately determined, thereby increasing the speed of deployment of the cable. The open channel defined by the engaging device also enables the apparatus to be lifted off the elongate object in an emergency without subsea intervention operations on the apparatus, and reduces the risk of damage to the elongate object.

The engaging device may comprise first position detector means for detecting the position of a first part of the elongate object.

The first position detector means may be adapted to detect the position of the first part of the elongate object prior to insertion of said first part into the trench.

The apparatus may comprise second position detector means for detecting the position of a second part of the elongate object.

The second position detector means may be adapted to detect the position of the second part of the elongate object subsequent to insertion of said second part into the trench.

This provides the advantage of enabling the path of an elongate object such as a cable extending from a surface vessel to the trench to be determined.

The apparatus may further comprise clearing means for clearing obstacles from the trench.

The clearing means may include at least one jetting device.

The engaging device may be moveable between a deployed position and a stowed position.

This provides the advantage of enabling the apparatus to be compact, which in turn allows it to be launched from the vessel stern. This ensures that if the apparatus needs to be recovered as a result of a failure, it can be lifted directly off the elongate object without maneuvering the vessel.

The apparatus may further comprise thrusters for enabling vertical and/or horizontal movement of the apparatus.

This provides the advantage of enabling free fly of the apparatus beyond the touch down position of the elongate object when launched from a vessel and the apparatus to land over a pre-cut trench.

The apparatus may further comprise means for increasing the buoyancy of the apparatus in water.

This provides the advantage of enabling the weight of the apparatus in water to be optimally matched to the power requirements of any thrusters used for free fly of the apparatus, and the weight of the apparatus in water to be optimised for depressing an elongate object such as a cable into the trench.

The apparatus may further comprise tracks for enabling the vehicle to move along the floor of the body of water.

According to another aspect of the present disclosure, there is provided a method of inserting a cable into a trench in a floor of a body of water, wherein the cable extends from a vessel on a surface of the body of water to the floor of the body of water, the method comprising determining the position of a first part of a cable before insertion of said first part into a trench; determining a position of a second part of the cable after insertion of the second part into the trench; determining the path of the cable from the vessel to the trench from the positions of said first and second parts; and adjusting the position of the vessel relative to the trench to adjust the path of the cable from the vessel to the trench.

This provides an advantage of enabling the path of the cable into the trench to be optimised, which in turn enables the rate of cable deployment to be improved.

The method may further comprise displacing obstacles in the trench.

The obstacles may be displaced by means of water jets.

Preferred embodiments of the disclosure will now be described, by way of example only and not in any limitative sense, with reference to the accompanying drawings, in which:—

FIG. 16 is a view of a surface vessel and the cable deployment apparatus of FIG. 1.

Figure 1:
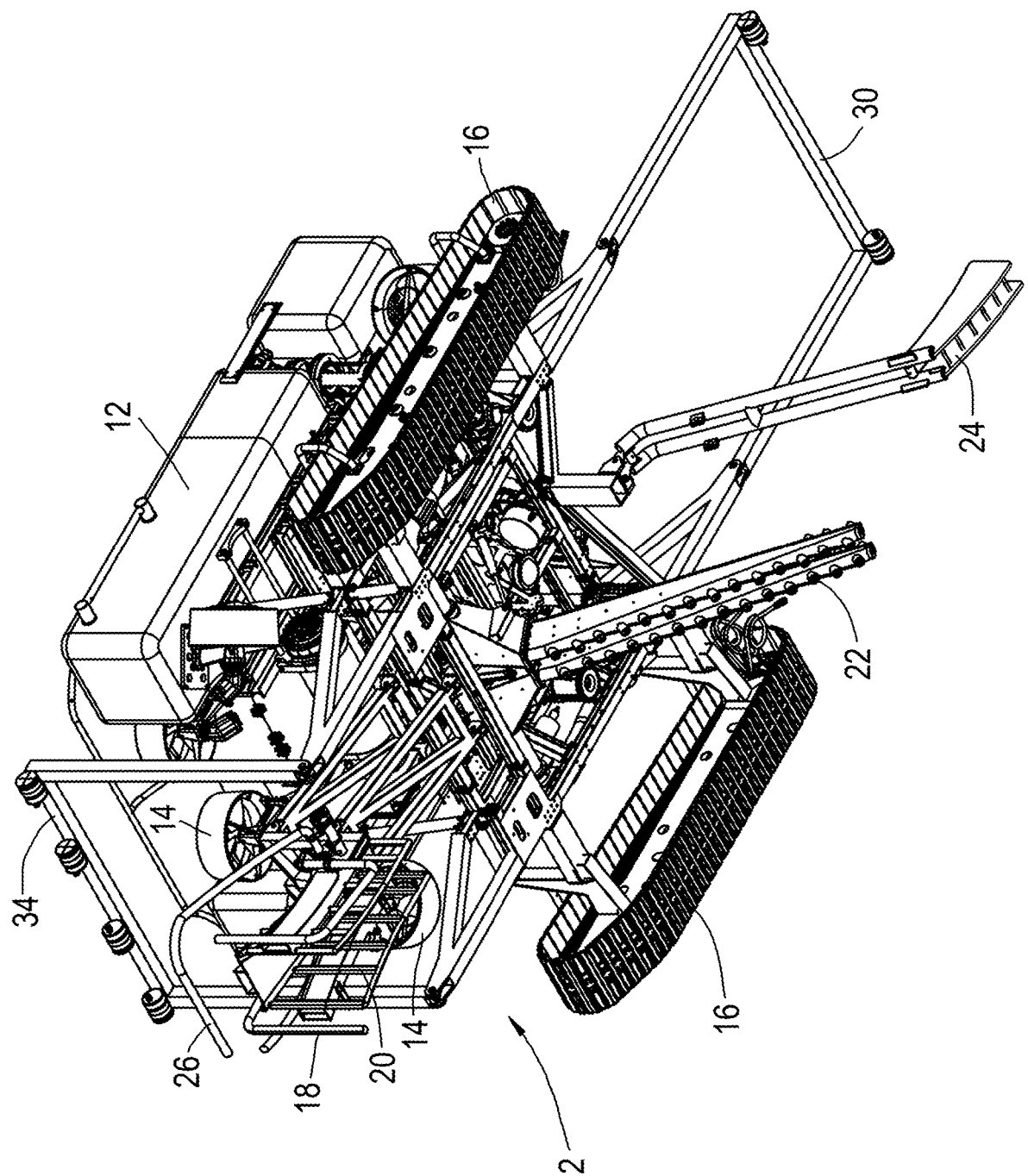
FIG. 1 is a perspective view from below of a cable deployment apparatus of an embodiment.
Figure 2:
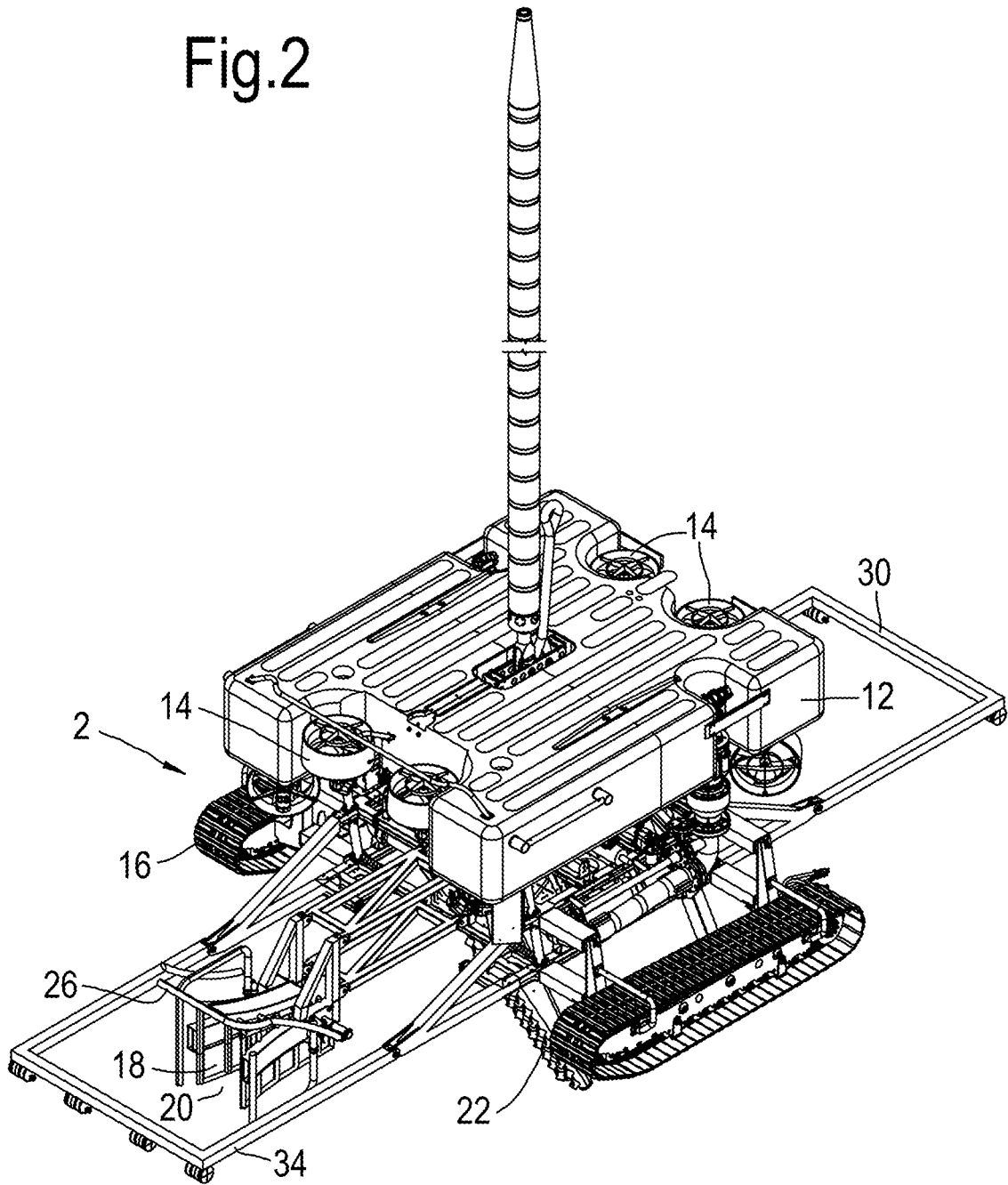
FIG. 2 is a perspective view from above of the cable deployment apparatus of FIG. 1.
Figure 3:
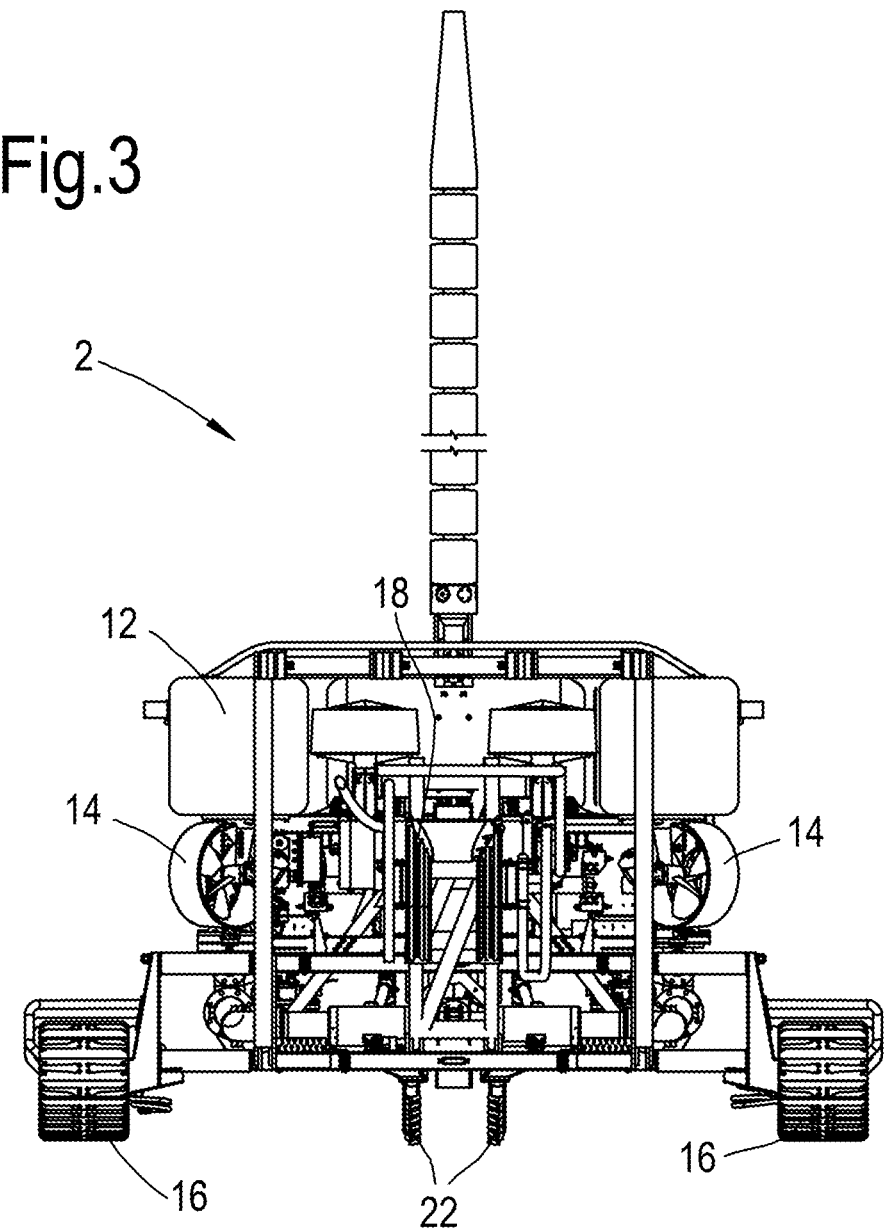
FIG. 3 is an end view of the cable deployment apparatus of FIG. 1 with components in a stowed condition.
Figure 4:
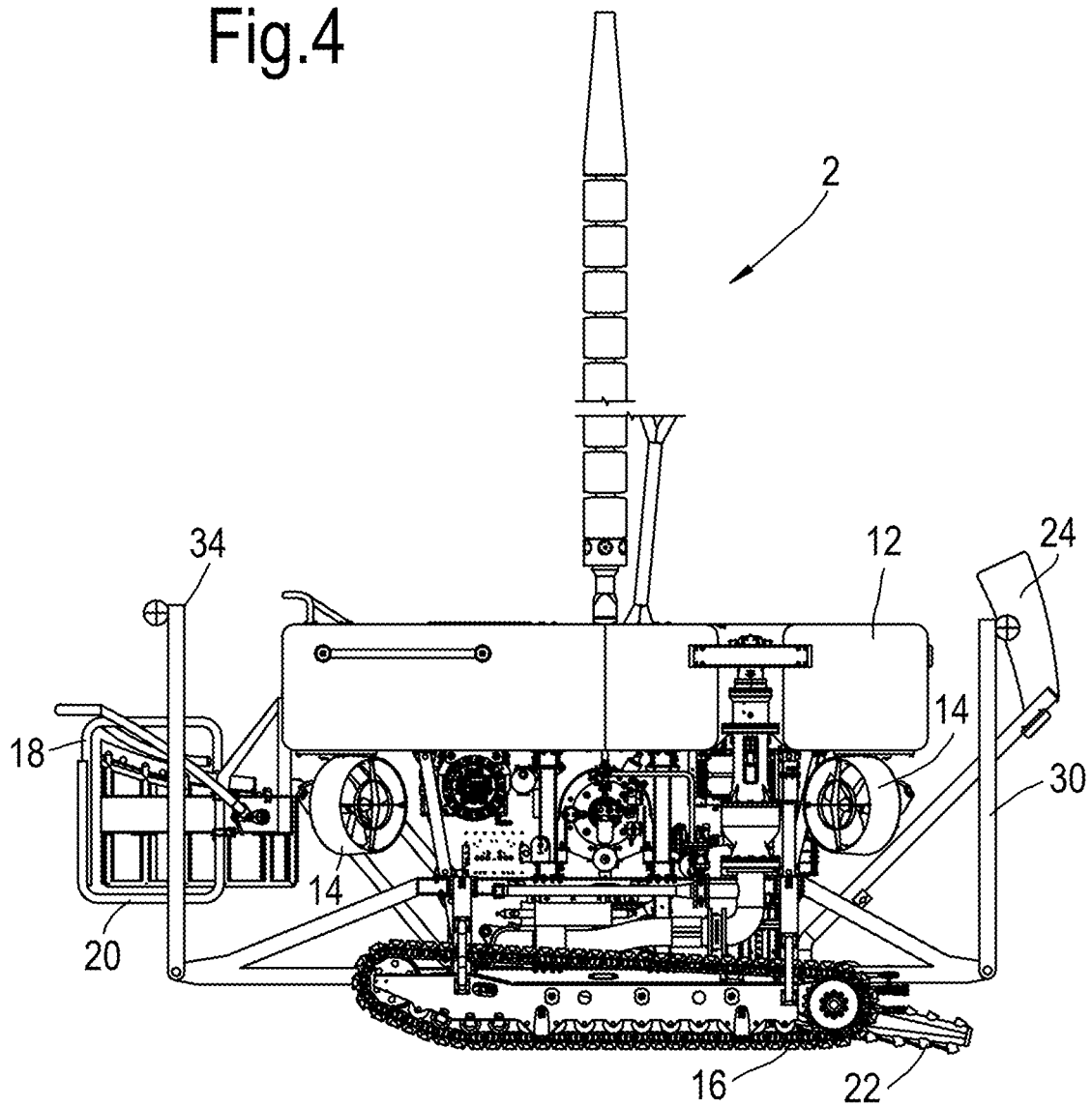
FIG. 4 is a side view of the cable deployment apparatus of FIG. 3.
Figure 5:
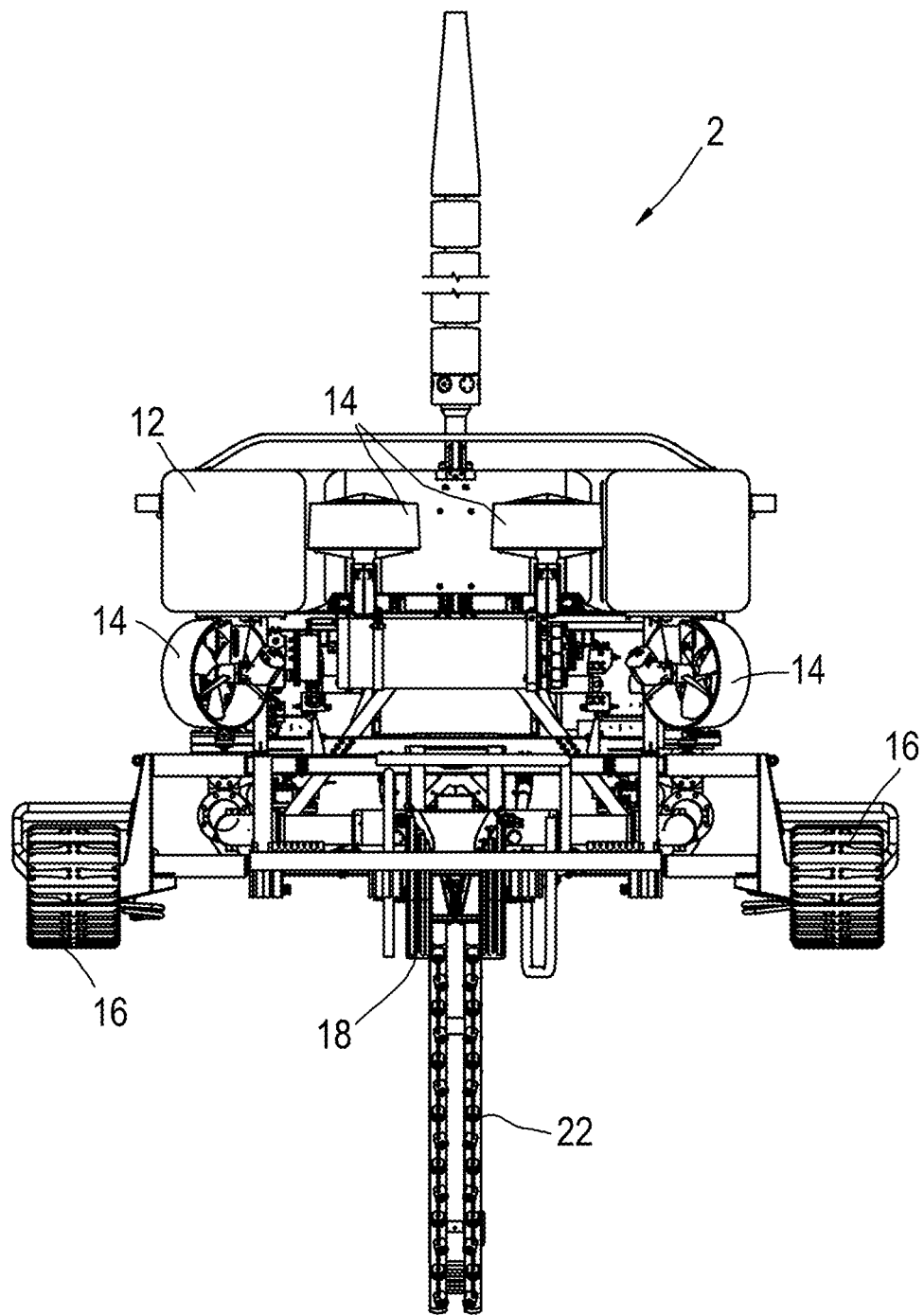
FIG. 5 is an end view of the cable deployment apparatus of FIG. 1 with components in a deployed condition.
Figure 6:
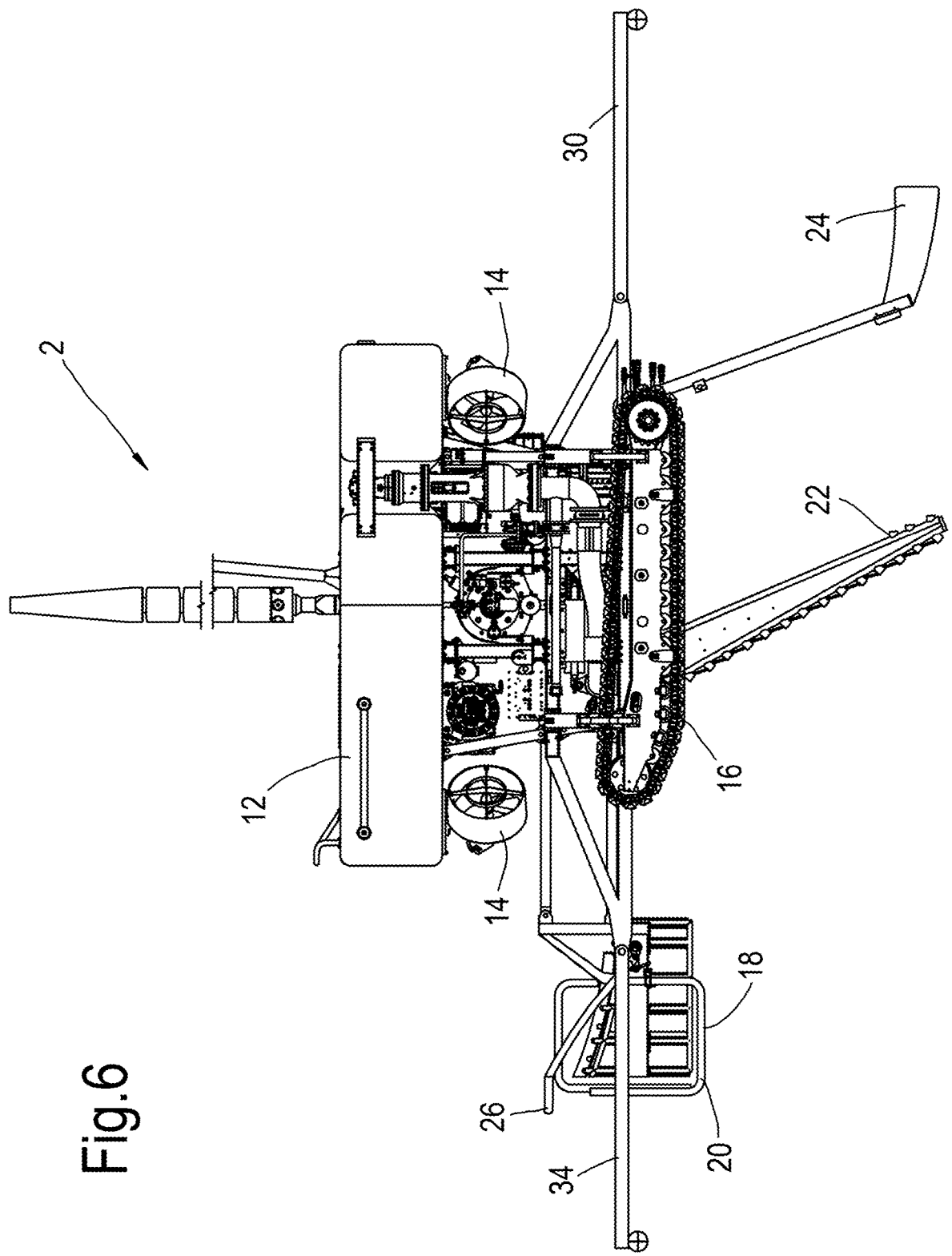
FIG. 6 is a side view of the cable deployment apparatus of FIG. 5.
Figure 7:
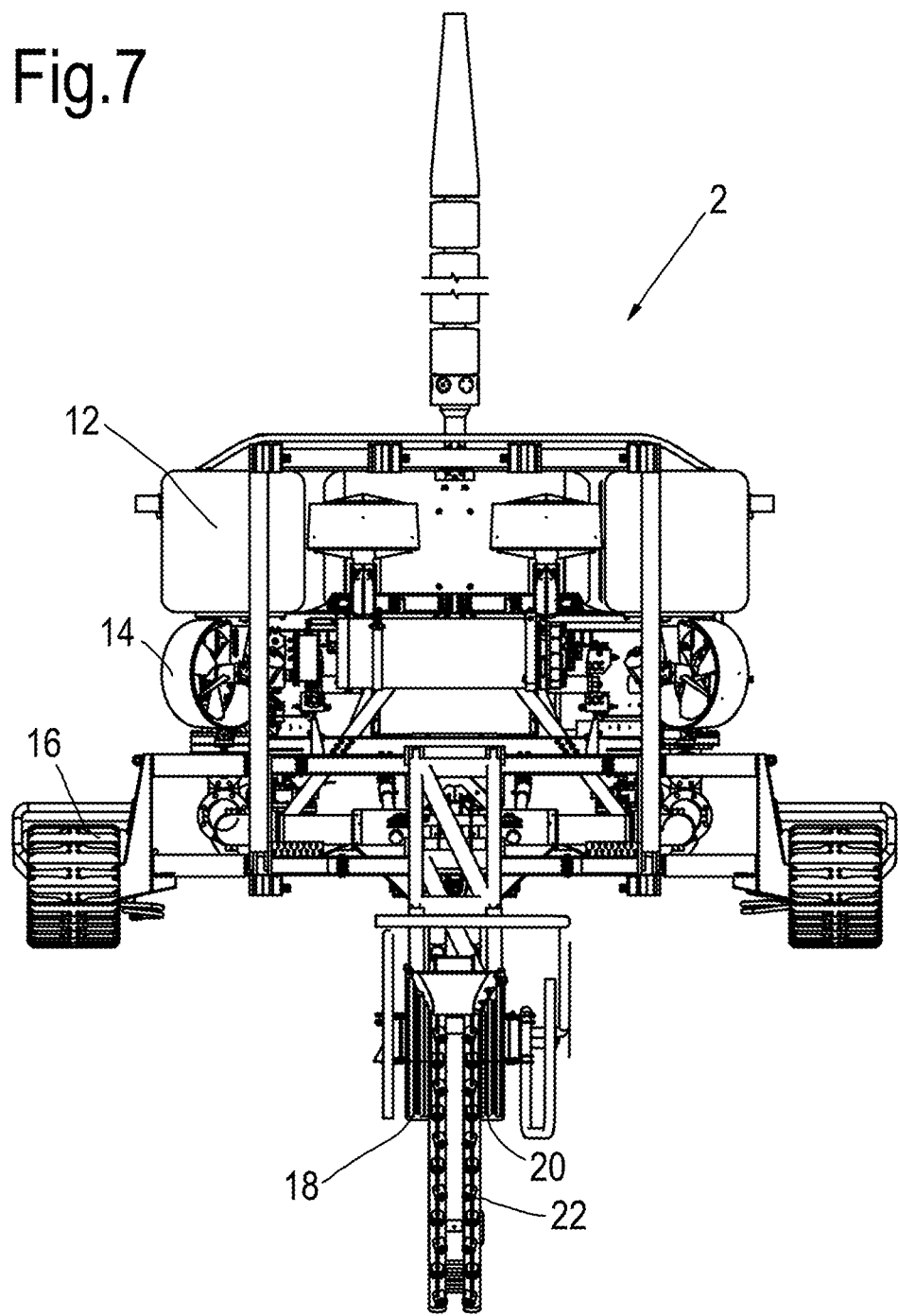
FIG. 7 is a front view of the cable deployment apparatus of FIG. 1 in a first mode.
Figure 8:
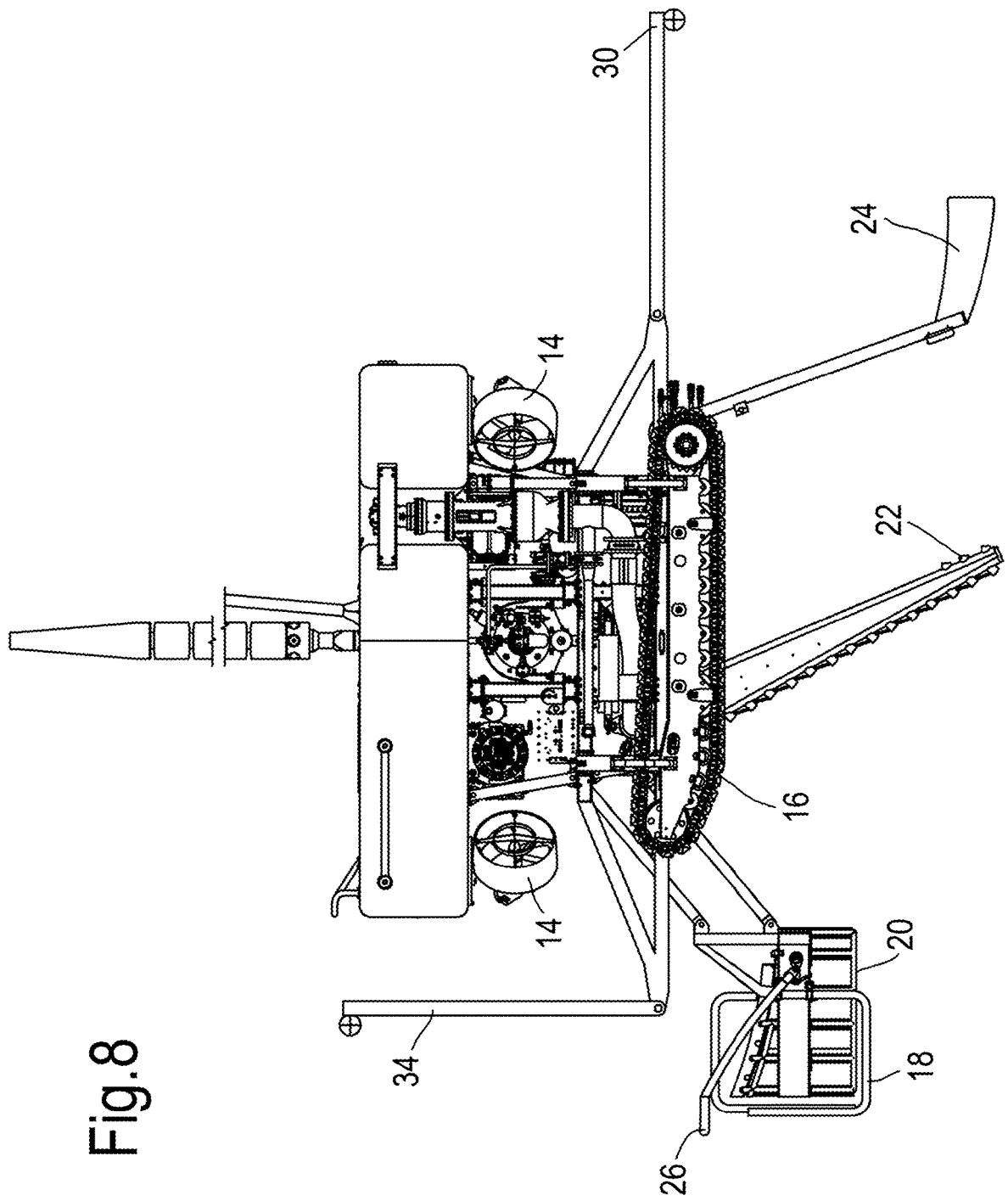
FIG. 8 is a side view of the cable deployment apparatus of FIG. 7.

Referring to the Figures, a cable deployment apparatus in the form of a remotely operated vehicle (ROV) 2 for deploying a cable 4 extending from a surface vessel 6 to a trench 8 in the sea bed 10 has a body 12, thrusters 14, tracks 16 for supporting the vehicle 2 on the sea bed 10 laterally of the trench 8, and a cable engagement device in the form of a bellmouth 18 located forwards of the vehicle body 12. The tracks 16 enable the vehicle 2 to progress along the trench 8 from the landing position towards the cable touchdown point The bellmouth 18 defines an open channel 20 in a direction facing the trench 8 for engaging a cable 4 to be deployed into the trench 8, so that the vehicle 2 can be lowered to and raised from the cable 4 with minimal risk of damage to the cable 4. Also, the open channel 20 of the bellmouth 18 facing the trench 8 enables the vehicle 2 to be lifted off the cable 4 in an emergency without subsea intervention operations on the vehicle 2.

The body 12 of the vehicle 2 contains a buoyancy block, and the thrusters 14 of the vehicle 2 comprise four vertical thrusters 14 and four horizontal thrusters 14. The vertical thrusters 14 enable free fly of the vehicle 2, and the horizontal thrusters 14 enable positioning of the vehicle 2. This enables free fly of the vehicle 2 beyond the cable touch down position when launched from the vessel 6 and the vehicle 2 to land over a pre-cut trench 8. The buoyancy block ensures that the vertical thruster power requirement for free fly operations is practicable.

The vehicle 2 also has a pair of jetting swords 22 for location on opposite sides of the cable 4 for clearing obstacles from the trench 8 by means of water jets, and a depressor 24 for pressing the cable 4 into the trench 8 rearwardly of the vehicle body 12. The buoyancy block size enables the in water weight of the vehicle 2 to be optimised for depressing a cable 4 into the trench 8 by ensuring that the in water weight of the vehicle 2 is sufficient to allow the cable 4 to be depressed with the vertical thrusters 14 thrusting upwards if required. The bellmouth 18 is provided with sensors 26 for determining the position of a first part 28 of the cable 4 before the first part 28 of the cable is inserted into the trench 8.

A cable tracker sensor 30 is located rearwards of the vehicle body 12 for determining the position of a second part 32 of the cable 4 subsequently to insertion of the second part 32 of the cable 4 into the trench 8. The positions of the first 28 and second 32 parts of the cable 4 enable the path of the catenary curve of the cable 4 from the surface vessel 6 to the sea bed 10 to be determined. A further cable sensor 34 is located forwards of the vehicle body 12.

The cable sensors 30, 34, cable engagement device 18 and depressor 24 are pivotable between a storage position and a deployed position. The jetters 22 are also pivotable to adjust the jetting depth. By providing components which are pivotable between storage and deployed positions, this provides the advantage of making the vehicle 2 compact, which allows it to be launched from the vessel stern, and ensures that if it is necessary to recover the vehicle 2 as a result of a failure, the vehicle 2 can be lifted directly off the cable 4 without maneuvering the vessel 6.

The operation of the vehicle 2 will now be described.

The determination of the position of the first part 28 of the cable 4 before the first part 28 of the cable 4 is inserted into the trench 8, and the second part 32 of the cable 4 after the second part 32 has been inserted into the trench 8, enables the path of the catenary curve of the cable 4 from the surface vessel 6 to the sea bed 10 to be determined. The rate of insertion of the cable 4 into the trench 8 can be optimised by adjusting the position of the surface vessel 6 relative to the vehicle 2, which in turn enables the shape of the catenary curve of the cable 4 to be adjusted.

Figure 9:
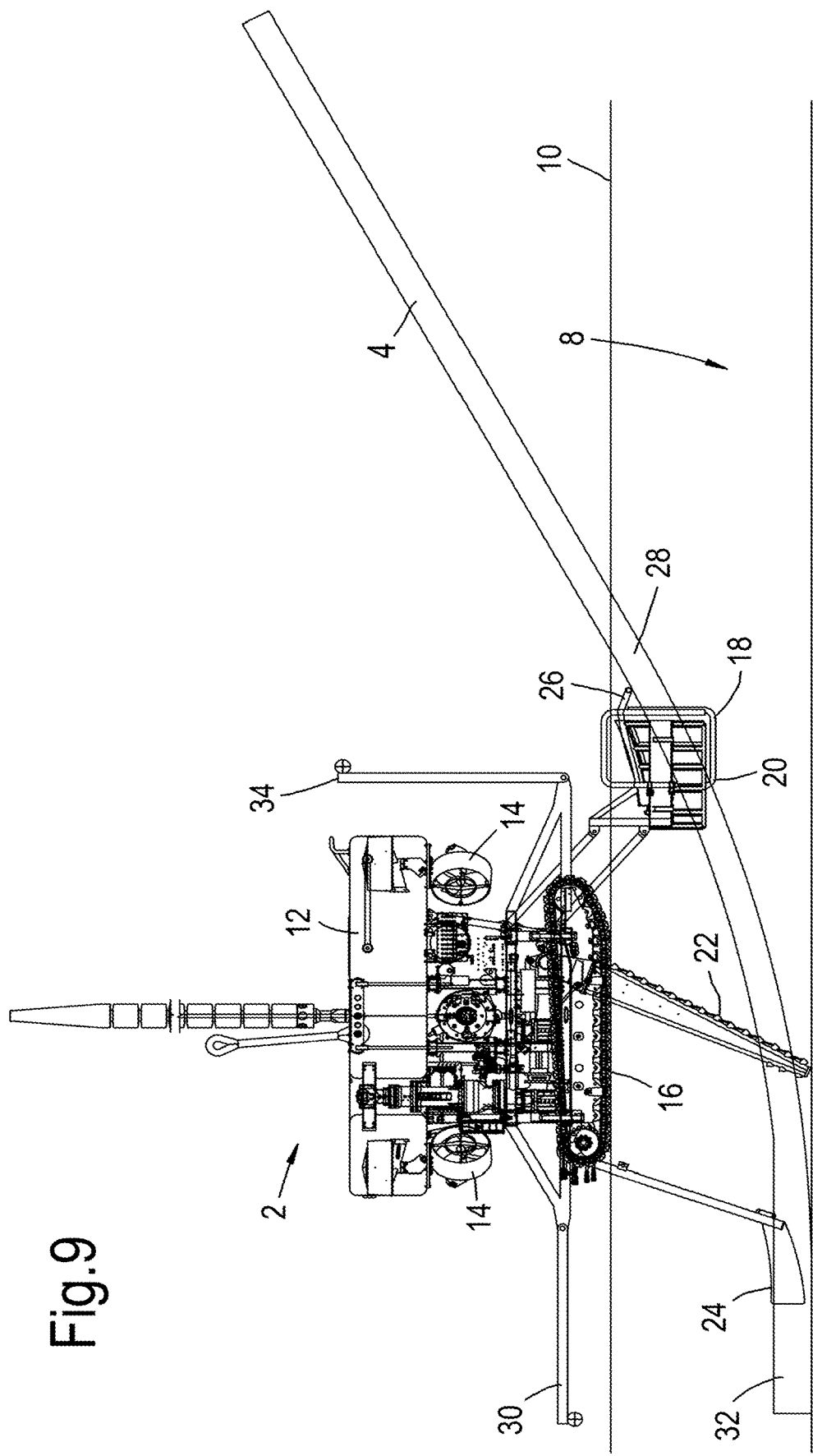
FIG. 9 is a side view of the cable deployment apparatus in the first mode for a first cable path.
Figure 10:
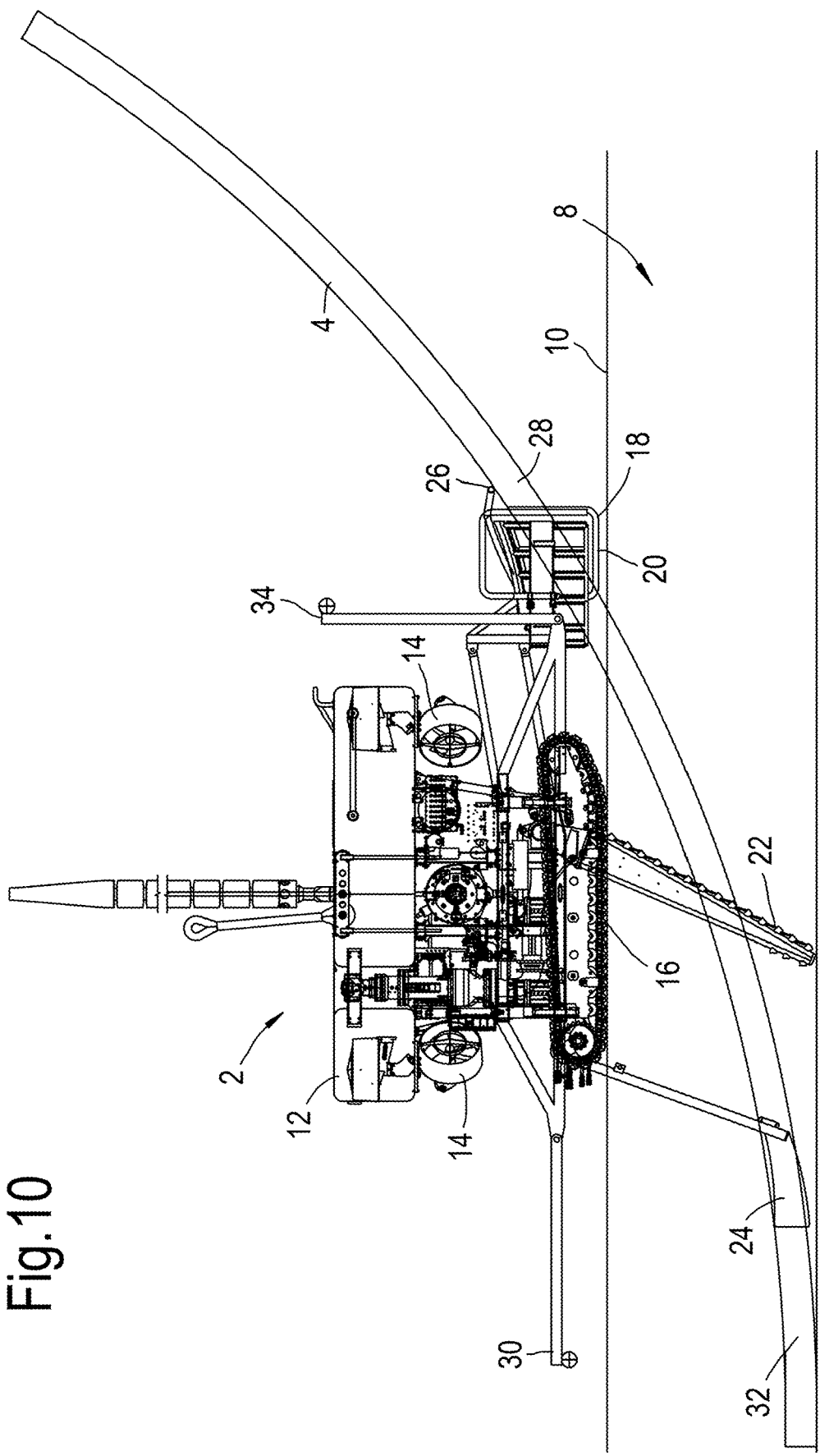
FIG. 10 is a side view of the cable deployment apparatus in the first mode for a second cable path.
Figure 11:
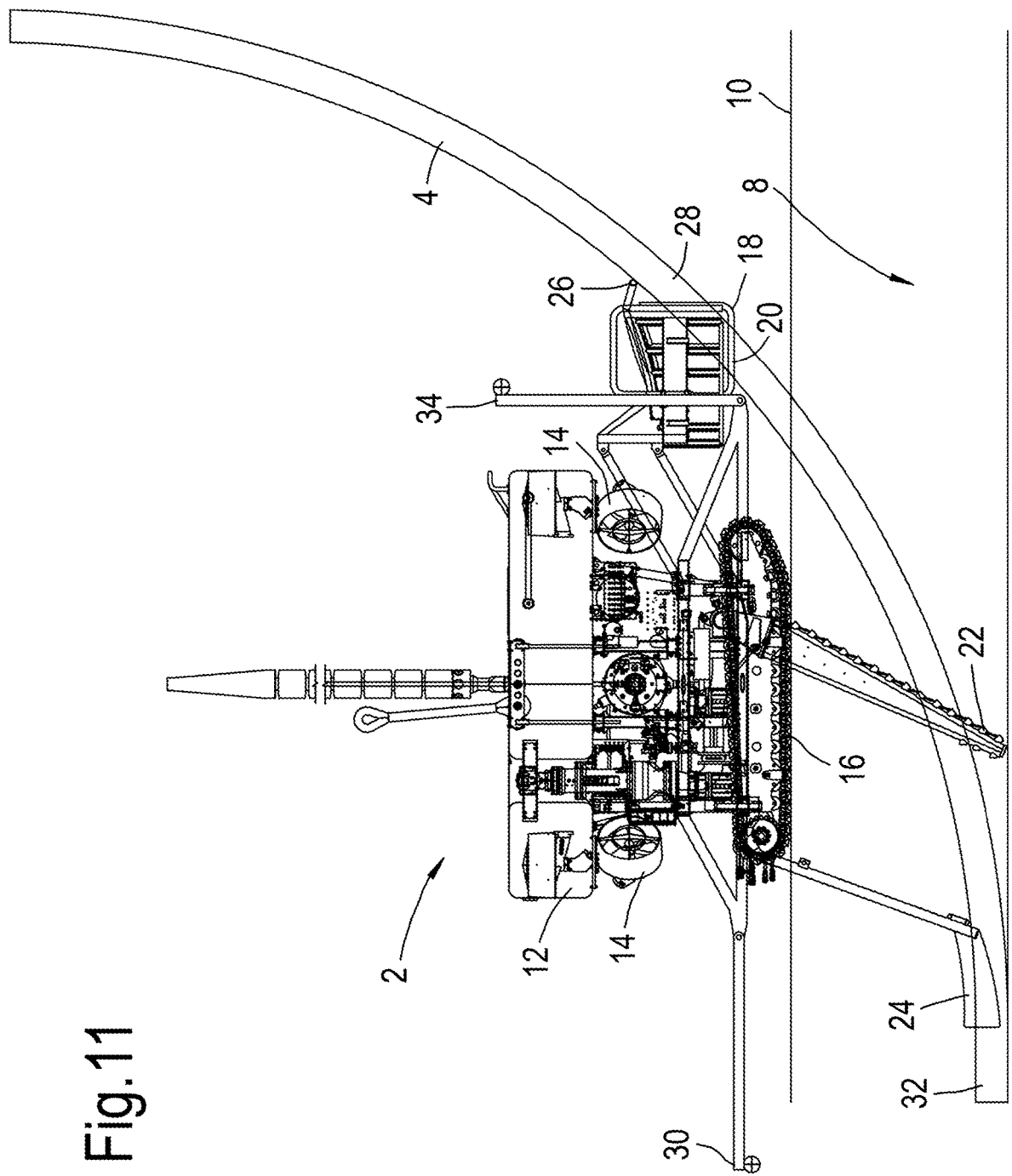
FIG. 11 is a side view of the cable deployment apparatus in the first mode for a third cable path.
Figure 12:
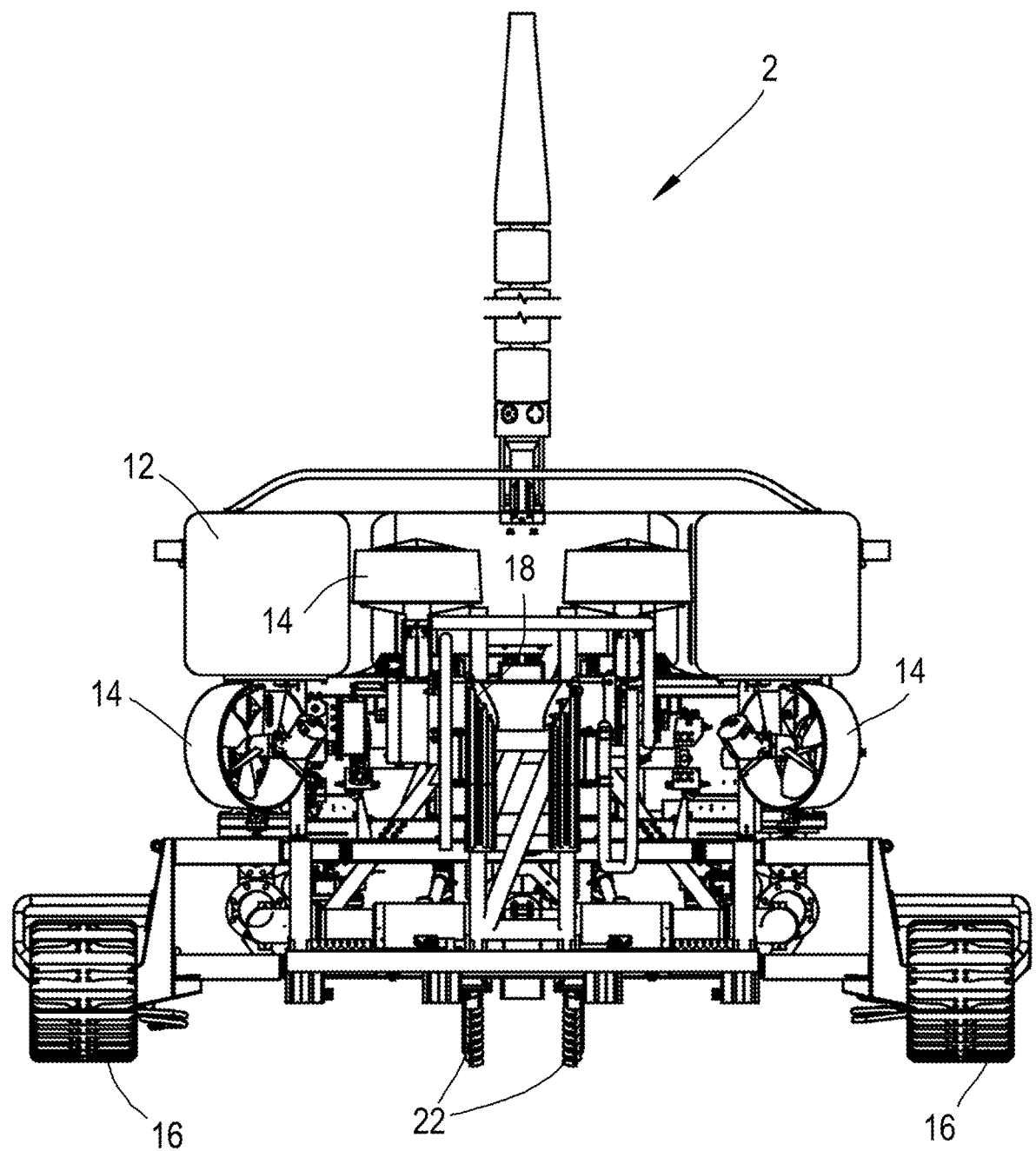
FIG. 12 is a front view of the cable deployment apparatus of FIG. 1 in a second mode.
Figure 13:
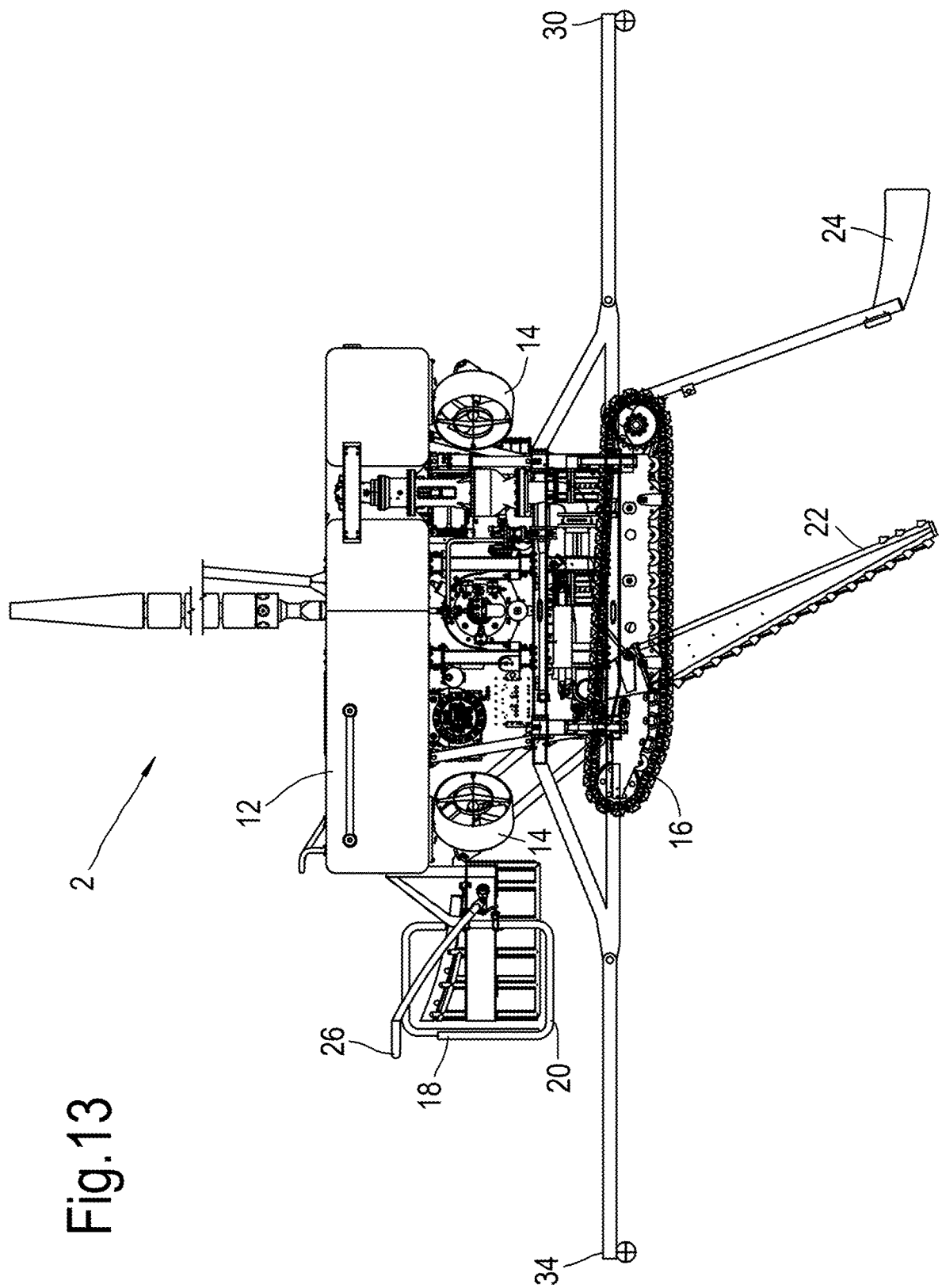
FIG. 13 is a side view of the cable deployment apparatus of FIG. 12.
Figure 14:
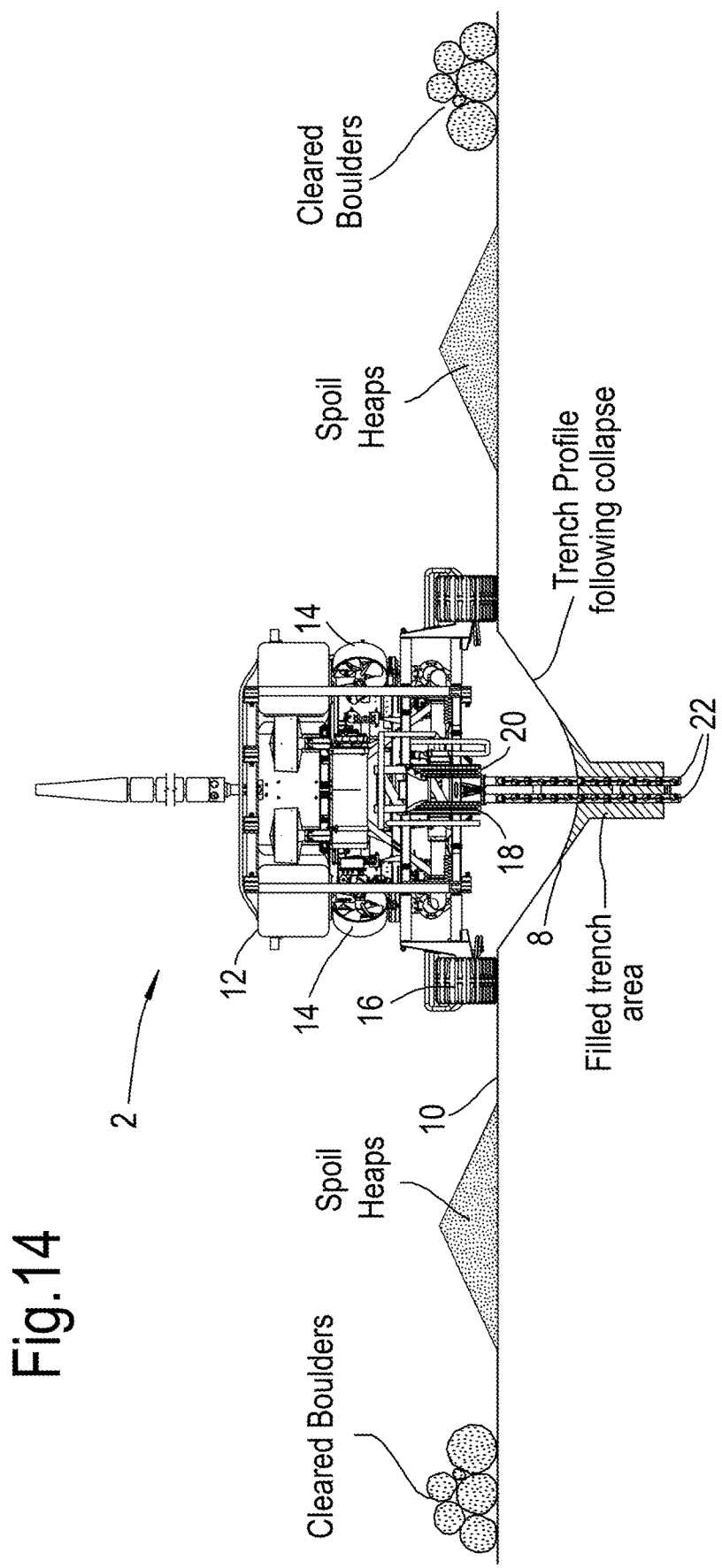
FIG. 14 is a front view of the cable deployment apparatus burying a cable in the trench in the second mode.
Figure 15:
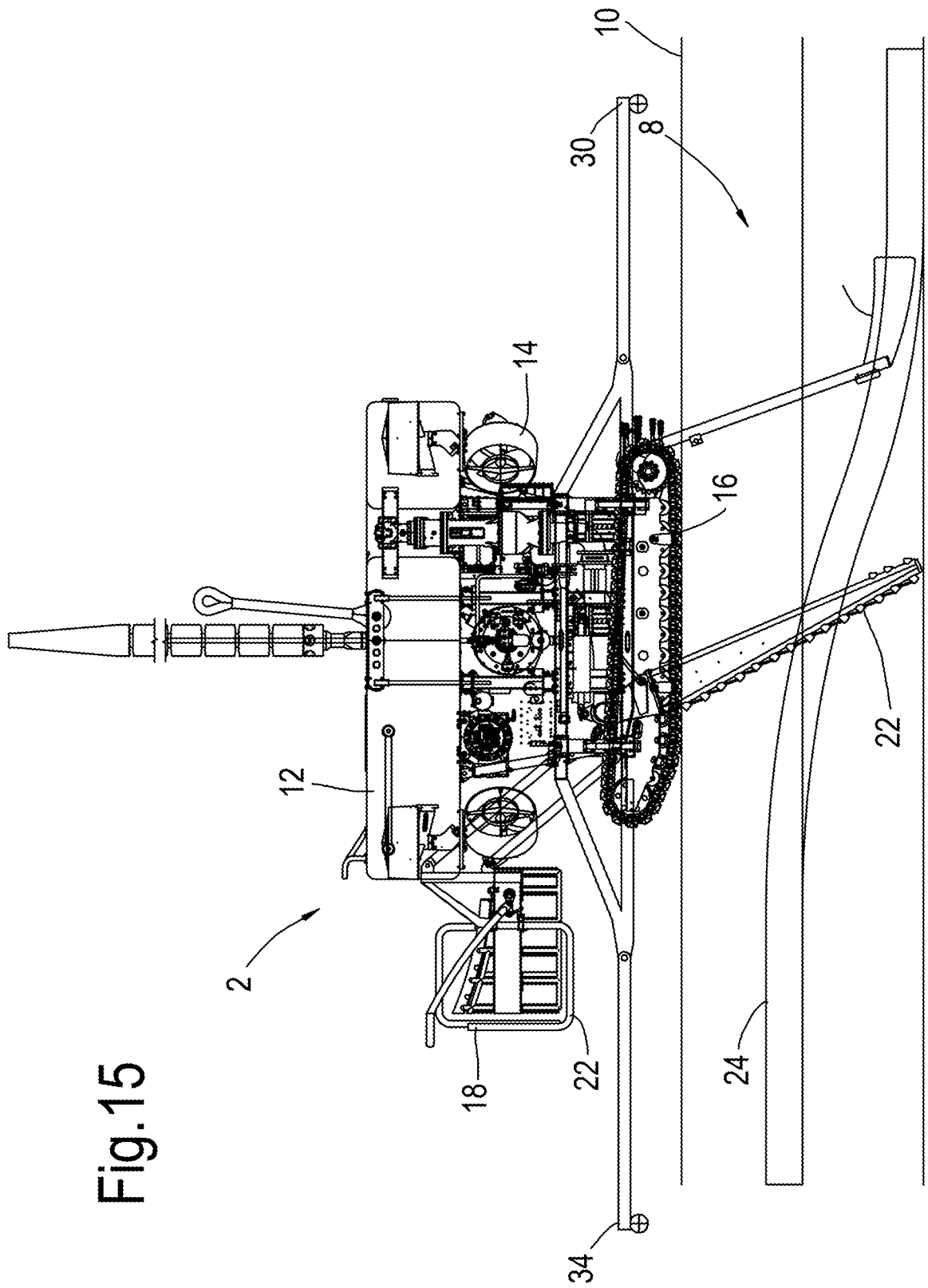
FIG. 15 is a side view of the cable deployment apparatus of FIG. 14.

As shown in greater detail in FIGS. 9 to 11, for a cable deployment operation with a long layback, the bellmouth 18 is located in the pre-formed trench 8 below the level of the sea bed 10. For a cable deployment operation with a medium layback, the bellmouth 18 is located in the pre-formed trench 8 at the level of the sea bed 10. For a cable deployment operation with a short layback, the bellmouth 18 is located above the level of the sea bed 10.

It will be appreciated by persons skilled in the art that the above embodiment has been described by way of example only and not in any limitative sense, and that various alterations and modifications are possible without departure from the scope of the disclosure as defined by the appended claims.

The invention claimed is:

1. An apparatus for deploying an elongate object into a trench in a floor of a body of water, the apparatus comprising a body adapted to move relative to a trench in a floor of a body of water, and an engaging device for engaging an elongate object and mounted to the body, wherein the engaging device is adapted to define an open channel in a direction facing the trench for engaging the elongate object, wherein the engaging device comprises at least one first position detector device located forward of the body and adapted to detect a forward position of a first part of the elongate object forward of the body prior to insertion of said first part into the trench, the apparatus further comprising at least one second position detector device located rearward of the body and adapted to detect a rearward position of a second part of the elongate object rearward of the body subsequent to insertion of the second part into the trench, wherein the forward position and the rearward position enable determination of a curved path of the elongate object being deployed.

2. An apparatus according to claim 1, further comprising at least one clearing device for clearing obstacles from the trench.

3. An apparatus according to claim 2, wherein at least one said clearing device includes at least one jetting device.

4. An apparatus according to claim 1, wherein the engaging device is moveable between a deployed position and a stowed position.

5. An apparatus according to claim 1, further comprising thrusters for enabling vertical and/or horizontal movement of the apparatus.

6. An apparatus according to claim 1, further comprising at least one device for increasing the buoyancy of the apparatus in water.

7. An apparatus according to claim 1, further comprising tracks for enabling the vehicle to move along the floor of the body of water.

8. An apparatus according to claim 1, wherein the open channel of the engaging device extends an entire length of the engaging device.

9. An apparatus according to claim 1, wherein the engaging device is a bellmouth that is pivotably mounted to the body.

10. An apparatus according to claim 1, wherein the at least one first position detector device is mounted to the engaging device such that the at least one first position detector device can move relative to the engaging device and is configured to contact the elongate object closer to a forward end of the open channel than a rearward end of the open channel.

11. An apparatus according to claim 10, wherein the at least one first position detector device is pivotably mounted to the engaging device.

12. An apparatus according to claim 1, further comprising a third position detector device located forward of the body and adapted to detect at least one of the forward position or another forward position of the first part of the elongate object prior to insertion of said first part into the trench.

13. An apparatus according to claim 1, wherein the open channel of the engaging device is defined by opposite side members bridged only by a top member.

14. An apparatus according to claim 1, wherein the open channel extends from a first end to a second end and is devoid of obstructions from the first end to the second end in the direction facing the trench.

15. An apparatus according to claim 1, wherein the at least one first position detector device and the at least one second position detector device are configured to concurrently detect the forward position of the first part of the elongate object and the rearward position of the second part of the elongate object.

16. A method of inserting a cable into a trench in a floor of a body of water, wherein the cable extends from a vessel on a surface of the body of water to the floor of the body of water, the method comprising determining the position of a first part of a cable before insertion of said first part into a trench;

determining a position of a second part of the cable after insertion of the second part into the trench;

determining the path of the cable from the vessel to the trench from the positions of said first and second parts; and adjusting the position of the vessel relative to the trench to adjust the path of the cable from the vessel to the trench.

17. A method according to claim 16, further comprising displacing obstacles in the trench.

18. A method according to claim 17, wherein the obstacles are displaced by means of water jets.

* * * * *